(12) United States Patent
Lee et al.

(10) Patent No.: US 10,554,865 B2
(45) Date of Patent: Feb. 4, 2020

(54) DISPLAY CONTROLLER FOR GENERATING VIDEO SYNC SIGNAL USING EXTERNAL CLOCK, AN APPLICATION PROCESSOR INCLUDING THE CONTROLLER, AND AN ELECTRONIC SYSTEM INCLUDING THE CONTROLLER

(71) Applicant: Samsung Electronics Co., Ltd., Suwon-si (KR)

(72) Inventors: Jong Hyup Lee, Seoul (KR); Min Chul Kim, Hwaseong-si (KR); Sung Hoo Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/405,640

(22) Filed: Jan. 13, 2017

(65) Prior Publication Data
US 2017/0208219 A1    Jul. 20, 2017

(30) Foreign Application Priority Data

Jan. 15, 2016   (KR) .......................... 10-2016-0005642

(51) Int. Cl.
| | |
|---|---|
| *G06F 3/038* | (2013.01) |
| *G09G 5/00* | (2006.01) |
| *H04N 5/06* | (2006.01) |
| *G09G 3/20* | (2006.01) |

(52) U.S. Cl.
CPC ............. *H04N 5/06* (2013.01); *G09G 3/2096* (2013.01); *G09G 2310/08* (2013.01); *G09G 2360/10* (2013.01); *G09G 2370/10* (2013.01)

(58) Field of Classification Search
CPC ............ H04N 5/06; H04N 5/228; H04N 5/04; H04N 9/44; H04N 5/235; G09G 3/20; G09G 3/2096; G09G 2310/08; G09G 2360/10; G09G 2370/10
USPC ..... 348/521, 522, 537, 222.1; 345/204, 211, 345/213, 501, 519
See application file for complete search history.

(56) References Cited

U.S. PATENT DOCUMENTS

| | | | |
|---|---|---|---|
| 4,945,413 A | 7/1990 | Merval et al. | |
| 5,808,691 A * | 9/1998 | Malcolm, Jr. | ........... H03L 7/085 348/537 |
| 6,177,922 B1 | 1/2001 | Schiefer et al. | |
| 6,441,847 B1 * | 8/2002 | Link | ..................... H04B 7/082 348/180 |
| 7,496,781 B2 | 2/2009 | Tamura et al. | |
| 7,671,897 B2 * | 3/2010 | Tsai | ..................... H04N 5/2353 348/222.1 |

(Continued)

FOREIGN PATENT DOCUMENTS

| | | |
|---|---|---|
| JP | 2000151566 | 5/2000 |
| JP | 2001094986 | 4/2001 |
| JP | 2001197050 | 7/2001 |

*Primary Examiner* — Trang U Tran
(74) *Attorney, Agent, or Firm* — Onello & Mello, LLP (57) ABSTRACT

In a display controller for generating a video sync signal using an external clock, he display controller includes an initializer configured to initialize an internal parameter in response to a frame start signal. A sync signal generation circuit is configured to count the external clock, increase the internal parameter, and generate the video sync signal according to a result of comparing the internal parameter that has been increased with a setting value. An original use of the external clock may not be generating the video sync signal.

17 Claims, 10 Drawing Sheets

(56) References Cited

U.S. PATENT DOCUMENTS

| | | |
|---|---|---|
| 7,859,594 B2 | 12/2010 | Komatsu |
| 7,969,507 B2 | 6/2011 | Kim |
| 8,130,027 B1 * | 3/2012 | Tuan .................. G11C 5/147 |
| | | 327/153 |
| 8,508,538 B2 | 8/2013 | Sakariya et al. |
| 8,918,669 B2 | 12/2014 | Ware et al. |
| 9,245,474 B2 * | 1/2016 | Tsai .................. G09G 3/2096 |
| 9,466,263 B2 * | 10/2016 | Bae .................. G09G 5/18 |
| 2014/0333608 A1 * | 11/2014 | Okairi .................. G09G 3/3648 |
| | | 345/214 |
| 2015/0049848 A1 | 2/2015 | Morita |

* cited by examiner

| CASE \ VAR | Dbpp Ibps | α | | | |
|---|---|---|---|---|---|
| | | 100Mhz | 200Mhz | 400Mhz | 800Mhz |
| CASE I | 0.75 | 64.22 | 1214.44 | 3514.87 | 8115.75 |
| CASE II | 1.00 | - | 639.33 | 2364.66 | 5815.31 |
| CASE III | 1.50 | - | 64.22 | 1214.44 | 3514.87 |
| CASE IV | 3.00 | - | - | 64.22 | 1214.44 |

DISPLAY CONTROLLER FOR GENERATING VIDEO SYNC SIGNAL USING EXTERNAL CLOCK, AN APPLICATION PROCESSOR INCLUDING THE CONTROLLER, AND AN ELECTRONIC SYSTEM INCLUDING THE CONTROLLER

CROSS-REFERENCE TO RELATED APPLICATIONS

This application claims priority under 35 U.S.C. § 119(a) from Korean Patent Application No. 10-2016-0005642 filed on Jan. 15, 2016, the disclosure of which is hereby incorporated by reference in its entirety.

BACKGROUND

Embodiments of the inventive concept relate to a display controller for generating a video sync signal using an external clock, and more particularly, to a display controller for generating a video sync signal using an external clock, an application processor including the display controller, and an electronic system including the display controller.

A video sync signal must be supplied by a host device at a correct timing so that video data is properly transferred to a peripheral device and displayed. Accordingly, a clock used during the generation of the video sync signal typically has a tolerance of less than several hertz. A dedicated phase-locked loop (PLL) or fractional divider may be used to generate the clock.

However, when a dedicated PLL is used, continuous power consumption may occur while video data is being displayed and an overall chip size is increased, along with the area occupied by the dedicated PLL. When a fractional divider is used, an additional first-in first-out (FIFO) may be required, and constraints irrelevant to the performance of a clock may need to be dealt with.

SUMMARY

In one aspect, the present inventive concepts are directed to a display controller for generating a video sync signal using an external clock. The display controller includes an initializer configured to initialize an internal parameter in response to a frame start signal; and a sync signal generation circuit configured to count the external clock, increase the internal parameter, and generate the video sync signal according to a result of comparing the internal parameter that has been increased with a setting value. An original use of the external clock may not be generating the video sync signal.

In another aspect, the present inventive concepts are directed to an application processor including a clock generator configured to generate an external clock; and a display controller configured to receive the external clock, count the external clock, increase an internal parameter, compare the internal parameter that has been increased with a setting value, and generate a video sync signal. An original use of the external clock may not be generating the video sync signal.

In another aspect, the present inventive concepts are directed to display controller comprising a first circuit that generates a horizontal sync signal of a video signal in response to clock cycles of a clock signal external to the display controller. The clock signal is used for the transmission of video data packets from the display controller to a display device via a display interface. A second circuit generates a vertical sync signal of the video signal in response to counting cycles of the horizontal sync signal.

BRIEF DESCRIPTION OF THE DRAWINGS

These and/or other aspects and advantages of the present general inventive concepts will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concepts, examples of which are illustrated in the accompanying drawings, wherein like reference numerals refer to the like elements throughout. The embodiments are described below in order to explain the present general inventive concepts by referring to the figures.

Figure 1:
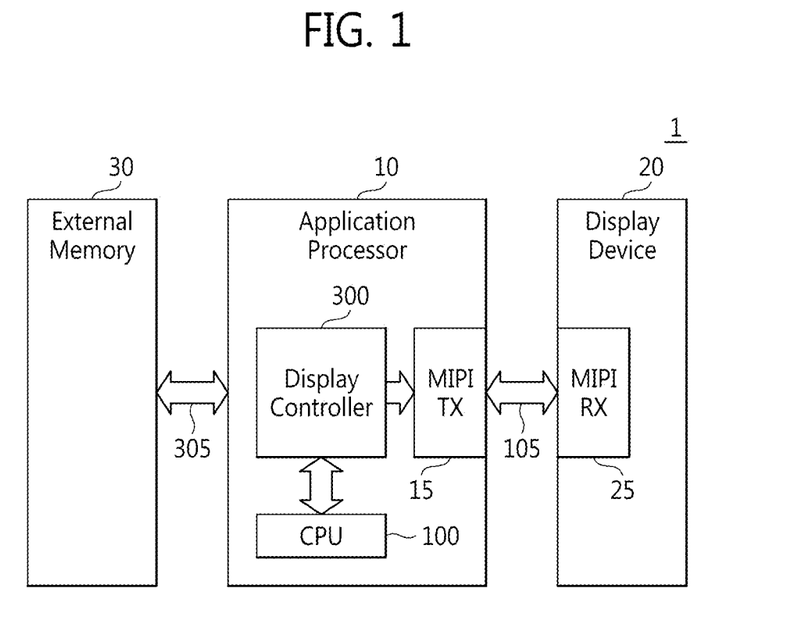
FIG. 1 is a schematic block diagram of an electronic system according to aspects of the inventive concept.

FIG. 1 is a schematic block diagram of an electronic system 1 according to aspects of the inventive concept. The electronic system 1 may include an application processor (AP) 10, a display device 20, an external memory 30, a display interface 105, and a memory interface 305.

The AP 10 may convert video data stored in the external memory 30 to a packet form and transmit a converted video packet to the display device 20. The AP 10 may use the memory interface 305 and the display interface 105 for the transmission of the video data or the video packet. The AP 10 may include a mobile industry processor interface (MIPI) transmitter (TX) 15 for the transmission of the video packet and the display device 20 may include a MIPI receiver (RX) 25 for the reception of the video packet.

For convenience's sake in the description, it is assumed that the display interface 105 is implemented as a MIPI interface complying with the MIPI Alliance standard for display serial interface (DSI) published by the MIPI® Alliance (http://mipi.org). The MIPI interface may include one clock lane and at least one data lane. The at least one data lane may have a multi-lane structure. However, the inventive concept is not restricted to the current embodiments. The display interface 105 may be implemented as a mobile display digital interface (MDDI), an interface supporting a display port (DP), an interface supporting an embedded DP (eDP), or a high-definition multimedia interface (HDMI).

The memory interface 305 may be implemented as an interface supporting peripheral component interconnect express (PCI-E), advanced technology attachment (ATA), serial ATA (SATA), parallel ATA (PATA), or serial attached SCSI (SAS).

The AP 10 may also include a central processing unit (CPU) 100 and a display controller 300. The CPU 100 may generally control elements included in the AP 10. The CPU 100 may generate a control signal and a plurality of setting values, which are necessary for the display controller 300 to generate a video sync signal and may output them to the display controller 300.

The display controller 300 may generate a video sync signal based on the control signal and the setting values received from the CPU 100. The display controller 300 may include an event timer (not shown) to generate the video sync signal. The display controller 300 may convert video data received from the external memory 30 to a packet form under the control of the CPU 100. The display controller 300 may output the video sync signal and a converted video packet to the MIPI TX 15.

The display device 20 may receive the video sync signal and the video packet through the MIPI interface 105. Although not shown, the display device 20 may also include a display driver and a display panel. The display driver may control the operation of the display panel and the display panel may display video packets output from the display driver. The display panel may be implemented as a liquid crystal display (LCD) panel, a light emitting diode (LED) display panel, an organic LED (OLED) display panel, an active-matrix OLED (AMOLED) display panel, or any other type of display panel suitable for displaying video packets output from the display driver.

The external memory 30 may store video data to be displayed on the display device 20. The external memory 30 may be implemented as volatile/non-volatile memory. The non-volatile memory may be implemented as electrically erasable programmable read-only memory (EEPROM), flash memory, magnetic random access memory (MRAM), spin-transfer torque MRAM, ferroelectric RAM (FeRAM), phase-change RAM (PRAM), resistive RAM (RRAM), nanotube RRAM, polymer RAM (PoRAM), nano floating gate memory (NFGM), holographic memory, molecular electronics memory device, insulator resistance change memory or any other type of volatile/non-volatile memory suitable for storing video data may be used.

The electronic system 1 may be implemented as a portable electronic device such as a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device. Herein below, an electronic system according to aspects of the inventive concept is compared with an electronic system in a comparison example under the predetermined conditions and differences there between will be described.

Figure 2A:
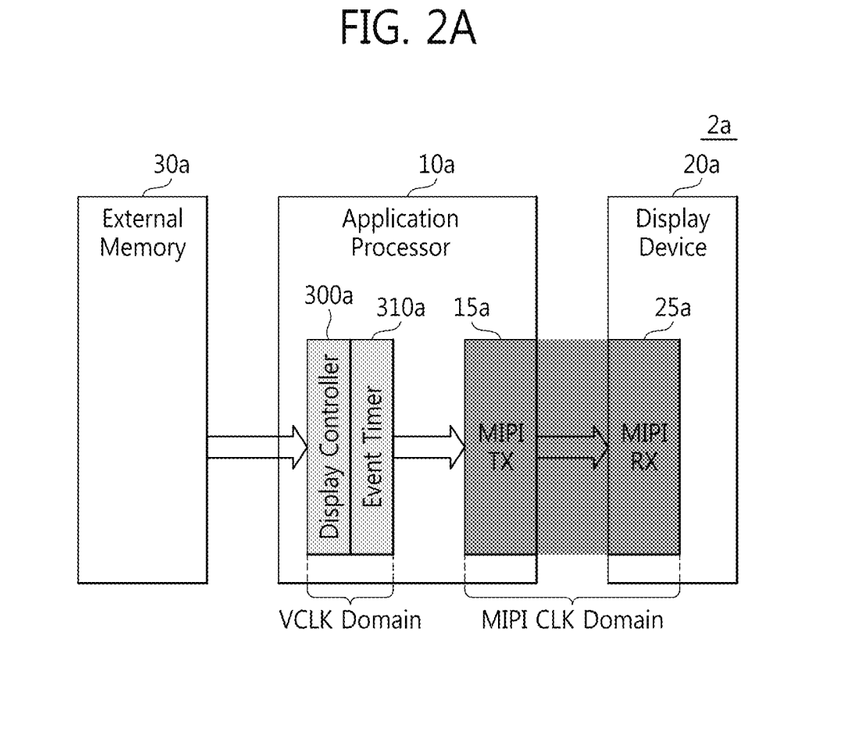
FIG. 2A is a schematic block diagram illustrating an electronic system in a comparison example.
Figure 2B:
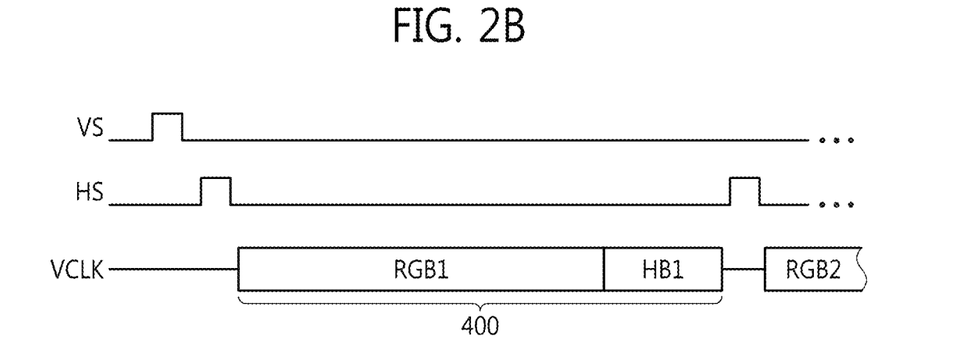
FIG. 2B is a timing chart illustrating a procedure in which the electronic system generates a video sync signal in the comparison example.
Figure 3A:
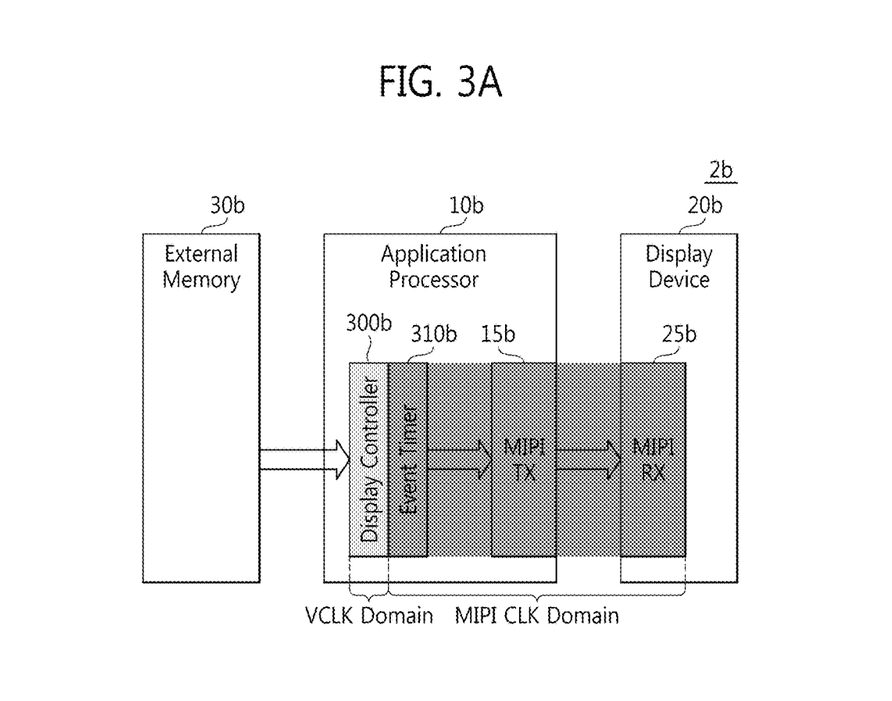
FIG. 3A is a schematic block diagram illustrating an electronic system according to aspects of the inventive concept.
Figure 3B:
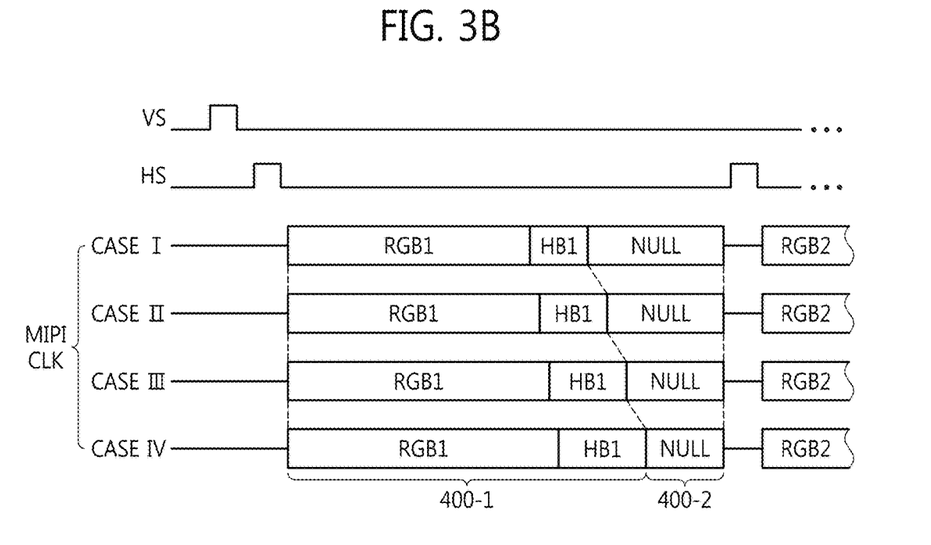
FIG. 3B is a timing chart illustrating a procedure in which the electronic system generates a video sync signal according to aspects of the inventive concept.
Figure 4:
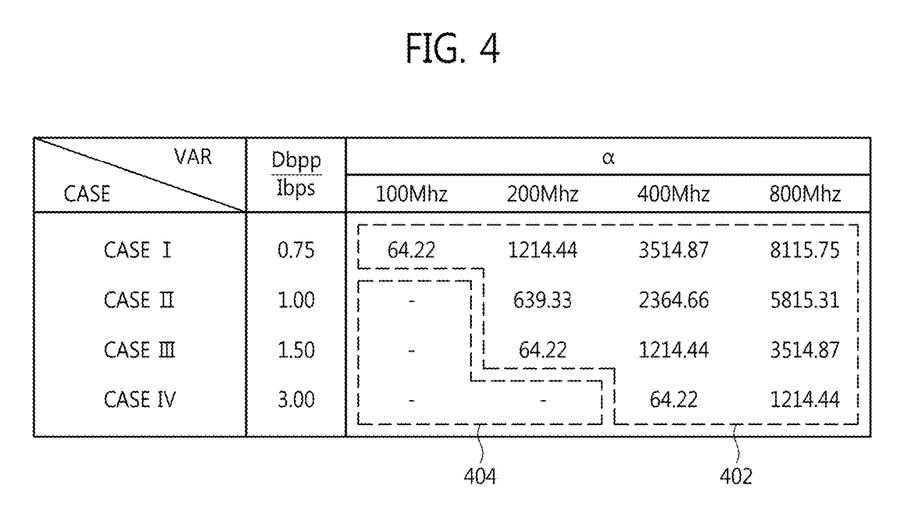
FIG. 4 is a diagram illustrating a number of mobile industry processor interface (MIPI) clock cycles that need to be additionally counted according to the transmission of a null packet when a video sync signal is generated using a MIPI clock.

FIG. 2A is a schematic block diagram illustrating an electronic system 2a in the comparison example. FIG. 2B is a timing chart illustrating a procedure in which the electronic system 2a generates a video sync signal in the comparison example. FIG. 3A is a schematic block diagram illustrating an electronic system 2b according to aspects of the inventive concept. FIG. 3B is a timing chart illustrating a procedure in which the electronic system 2b generates a video sync signal according to aspects of the inventive concept. FIG. 4 is a table illustrating the number of MIPI clock cycles that need to be additionally counted according to the transmission of a null packet when a video sync signal is generated using a MIPI clock.

Referring to FIGS. 2A through 3B, the structure and functions of elements of each of the electronic systems 2a and 2b respectively illustrated in FIGS. 2A and 3A are the same as those of the elements described with respect to the electronic system 1 illustrated in FIG. 1. Thus, redundant descriptions will be omitted.

It is assumed that the electronic systems 2a and 2b operate under the following predetermined conditions. Firstly, the electronic systems 2a and 2b may require an additional horizontal speed action (HSA) packet, horizontal back porch (HBP) packet, horizontal active (HRCT) packet, horizontal front porch (HFP) packet, vertical speed action (VSA) packet, vertical back porch (VBP) packet, vertical active (VACT) packet, and vertical front porch (VFP) packet to transmit a video packet corresponding to a single frame. However, to simplify calculation, it is assumed that the electronic systems 2a and 2b require only horizontal blank (BB) and vertical blank (VB) as representatives of those packets. Here, it is assumed that the HB has a size of 6 and the VB has a size of 12. Secondly, it is assumed that the video packet is RGB data Dbpp expressed in 24 bits per pixel (bpp), a frame rate (FR) of the video packet is 60 fps, the size (i.e., Width*Height) of a frame is 1080*1920, and a data throughput Ibps of the MIPI interface is 24 bits per second (bps).

Meanwhile, the electronic systems 2a and 2b may have the following differences. While an event timer 310a included in the electronic system 2a illustrated in FIG. 2A may operate in a dedicated clock domain, i.e., a VCLK domain; an event timer 310b included in the electronic system 2b illustrated in FIG. 3A may operate in an MIPI clock domain. In other words, the event timer 310a may use a dedicated clock VCLK received from a display controller 300a to generate video sync signals horizontal sync (HS) and vertical sync (VS). However, the event timer 310b may use a MIPI clock MCLK received from a MIPI TX 15b to generate the video sync signals HS and VS. Here, the dedicated clock VCLK refers to a clock used by the event timer 310a to generate the video sync signals HS and VS and the MIPI clock MCLK refers to a clock used by the MIPI TX 15b to transmit data through MIPI interface.

Based on the above-described conditions and the differences between the electronic systems 2a and 2b, a procedure in which the electronic system 2a illustrated in FIG. 2A generates a video sync signal using the dedicated clock VCLK will be described first, and then a procedure in which the electronic system 2b illustrated in FIG. 3A generates a video sync signal using the MIN clock MCLK will be described.

To transmit a video packet, the electronic system 2a illustrated in FIG. 2A may use the dedicated clock VCLK having a frequency determined by Equation 1:

$$f_{VCLK} = (\text{Width} + HB) \times (\text{Height} + VB) \times FR \times \frac{Dbpp}{Ibps} \quad (1)$$

$$= (1080 + 6) \times (1920 + 12) \times 60 \times \frac{24}{24} = 125.889 [\text{Mhz}].$$

In other words, when the electronic system 2a illustrated in FIG. 2A transmits a video packet using the dedicated clock VCLK of 125.889 MHz under the above-described conditions, the electronic system 2a will count (1080+6) cycles of the dedicated clock VCLK and generate the horizontal sync signal HS and will count (1920+12) cycles of the horizontal sync signal HS and generate the vertical sync signal VS. However, the electronic system 2b illustrated in FIG. 3A may count (1080+6+α) cycles of the MIPI clock MCLK and generate the horizontal sync signal HS and it may count (1920+12) cycles of the horizontal sync signal HS and generate the vertical sync signal VS.

Here, "α" is the number of cycles of the MIPI clock MCLK which are additionally counted when the electronic system 2b generates the video sync signals HS and VS using the MIPI clock MCLK as compared to when the electronic system 2a generates the video sync signals HS and VS using the dedicated clock VCLK. Accordingly, "α" has a value of at least 0 and may be determined by Equation 2:

$$\alpha = \frac{f_{MCLK}}{(\text{Height} + VB) \times FR \times \frac{Dbpp}{Ibps}} - (\text{Width} + HB) \quad (2)$$

Here, the frequency $f_{MCLK}$ of the MIPI clock MCLK may be variously determined taking account of a display device specification or avoidance of electro-magnetic interference (EMI) involved in communication frequency perturbation. The data throughput Ibps of the MIPI interface may also be variously determined according to the change in the number of data lanes in the MIPI interface having the multi-lane structure. Accordingly, it is considered that the frequency $f_{MCLK}$ of the MIPI clock MCLK is 100, 200, 400 or 800 MHz and the data throughput Ibps of the MIPI interface is 32, 24, 16, or 8 bps to calculate a specific value of "α".

In particular, cases CASE I through CASE IV are distinguished from one another by the change in the data throughput Ibps of the MIPI interface. The data throughput Ibps of the MIPI interface is 32, 24, 16, and 8 bps in the cases CASE I through CASE IV, respectively.

The changes in "α" according to the frequency $f_{MCLK}$ of the MIPI clock MCLK and the change in the data throughput Ibps of the MIPI interface will be described with reference to FIGS. 2B, 3B, and 4. For convenience sake in the description, FIGS. 2B and 3B illustrate timing charts during a procedure in which the electronic systems 2a and 2b transmit a video packet RGB1 corresponding to a first line of a frame.

Referring to FIG. 2B, the electronic system 2a may sequentially generate the vertical sync signal VS and the horizontal sync signal HS using the dedicated clock VCLK and then transmit the video packet RGB1 and a packet HB1 corresponding to an HB (400). Referring to FIG. 3B, the electronic system 2b may sequentially generate the vertical sync signal VS and the horizontal sync signal HS using the MIPI clock MCLK, then transmit the video packet RGB1 and the packet HIB1 corresponding to an HB (400-1), and then additionally transmit a null packet (400-2). In the cases CASE I through CASE IV, the number of null packets (400-2) may decrease as the data throughput Ibps of the MIPI interface decreases. In other words, VS will occur at the beginning of every frame (whenever iP2 equals to SV2). HS will occur every line in the frame (whenever iP1 equals to SV1). In the case of a multi-frame operation, as described in detail below, HS and VS may be systematically generated at the beginning of a first frame among the multi-frames as shown below, and then VS occurs as the result of counting HS. For example, it is understood that VS occurs in the initial stage (and optionally HS may also occur in initial stage), and then VS occurs as a result of HS. That is, although VS is generated by counting HS, initially VS can be controlled to occur regardless of HS.

Referring to FIG. 4, the electronic system 2b may additionally count "α" cycles of the MIPI clock MCLK, which are calculated according to the frequency $f_{MCLK}$ of the MIPI clock MCLK and the data throughput Ibps of the MIPI interface, during the transmission of null packets. In the cases CASE I through CASE IV, "α" may decrease as the data throughput Ibps of the MIPI interface decreases. When the frequency $f_{MCLK}$ of the MIPI clock MCLK changes from 100 to 200, 400, and 800 MHz in the cases CASE I through CASE IV; "α" may increase. Since "α" has a value of at least 0, the electronic system 2b may change the frequency $f_{MCLK}$ of the MIPI clock MCLK and the data throughput Ibps of the MIPI interface within a range 402 in which "α" is calculated at a value of at least 0, excluding a case 404 when "α" is calculated at a value less than 0.

As described above, the electronic system 2b may generate video sync signals HS and VS using the MIPI clock MCLK instead of the dedicated clock VCLK. In other words, the electronic system 2b may generate the video sync signals HS and VS using the MIPI clock MCLK that is originally used by the MIPI TX, 15b not for the generation of the video sync signals HS and VS, but for the transmission of data through the MIPI interface. Moreover, the electronic system 2b eliminates the need for a dedicated phase-locked loop (PLL) and/or a dedicated fractional divider used to generate the video sync signals HS and VS, thereby generating the video sync signals HS and VS at low cost and low power.

The electronic system 2b may generate the video sync signals HS and VS using the MIPI clock MCLK having a lower frequency than the dedicated clock VCLK (i.e., when the frequency $f_{MCLK}$ of the MIPI clock MCLK is 100 MHz in the case CASE I). In other words, the electronic system 2b may generate the video sync signals HS and VS using the MIPI clock MCLK having a lower frequency than the dedicated clock VCLK as well as the MIPI clock MCLK having a higher frequency than the dedicated clock VCLK. As a result, the electronic system 2b may generate the video sync signals HS and VS at low cost and low power.

Figure 5:
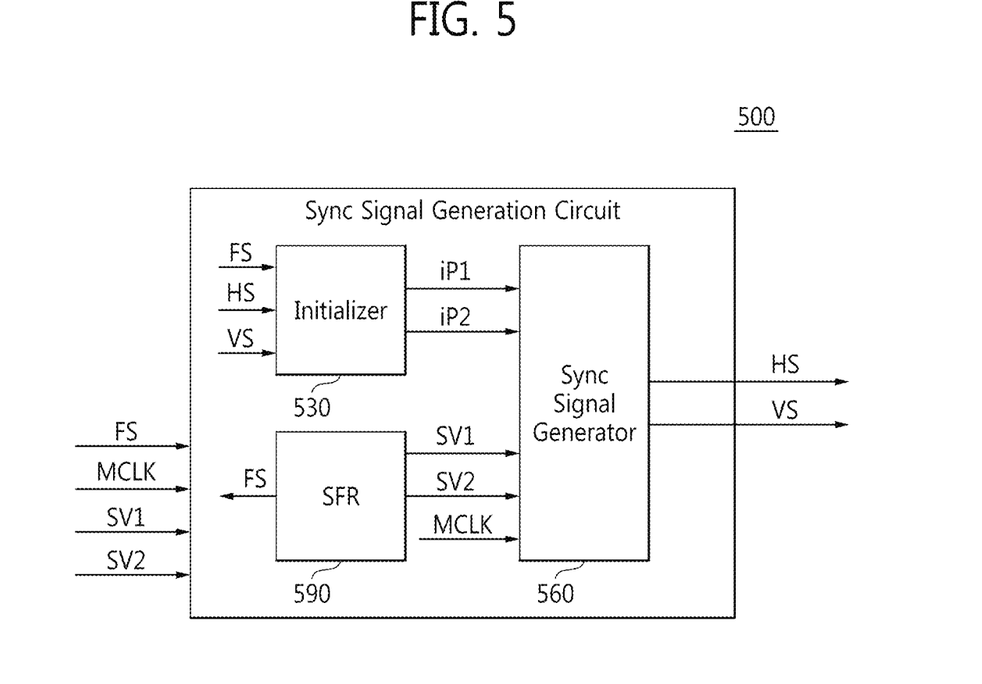
FIG. 5 is a schematic block diagram of a sync signal generation circuit according to aspects of the inventive concept.
Figure 6:
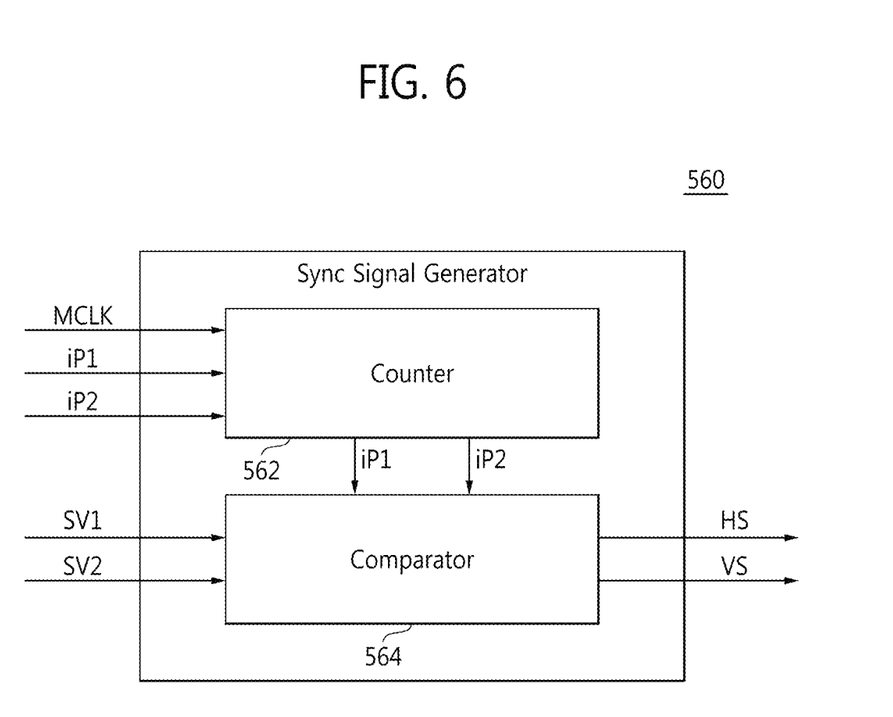
FIG. 6 is a schematic block diagram of a sync signal generator illustrated in FIG. 5.

FIG. 5 is a schematic block diagram of a sync signal generation circuit 500 according to aspects of the inventive concept. FIG. 6 is a schematic block diagram of a sync signal generator 560 illustrated in FIG. 5. Referring to FIGS. 1, 5, and 6, the sync signal generation circuit 500 may include an initializer 530, the sync signal generator 560, and a special function register (SFR) 590. The sync signal generator 560 may include a counter 562 and a comparator 564.

The sync signal generation circuit 500 may be included inside the display controller 300 or 300b illustrated in FIG. 1 or 3A and may function as the event timer 310b illustrated in FIG. 3A. A procedure in which the sync signal generation circuit 500 generates the horizontal sync signal HS will be described first.

The initializer 530 may receive a frame start signal FS and initialize a first internal parameter iP1 of the sync signal generation circuit 500 in response to the frame start signal FS. The initializer 530 may output the first internal parameter iP1 that has been initialized to the sync signal generator 560. The frame start signal FS may be a trigger signal for transmitting video data stored in the external memory 30 to the display device 20. The frame start signal FS may be set and stored in the SFR 590 in advance of the operation of the sync signal generation circuit 500.

The sync signal generator 560 may count the MIN clock MCLK, increase the first internal parameter iP1 received from the initializer 530, and generate the horizontal sync signal HS according to a result of comparing the first internal parameter iP1 that has been increased with a first setting value SV1. The first internal parameter iP1 may be increased by the counter 562 and comparison between the first internal parameter iP1 that has been increased and the first setting value SV1 may be performed by the comparator 564. The comparator 564 may generate the horizontal sync signal HS when a value of the first internal parameter iP1 is equal to or greater than the first setting value SV1. The first setting value SV1 may be determined by Equation 3:

$$SV1 = (Width + HB + |\alpha|) \times |[SO1] \frac{Dbpp}{Ibps}, \quad (3)$$

where "Width" is the width of a frame, HB is the size of a horizontal blank, α is a value calculated using Equation 2, Dbpp is the number of bits per pixel in video data, and Ibps is the data throughput of the MIDI interface.

During the procedure in which the sync signal generator 560 generates the horizontal sync signal HS, the operations of the counter 562 and the comparator 564 may be performed within a single period of the MIPI clock MCLK in synchronization with the MIPI clock MCLK. When the sync signal generator 560 generates the horizontal sync signal HS, the initializer 530 may receive the horizontal sync signal HS and initialize the first internal parameter iP1.

Now, a procedure in which the sync signal generation circuit 500 generates the vertical sync signal VS will be described. The initializer 530 may receive the frame start signal FS, may initialize a second internal parameter iP2 of the sync signal generation circuit 500 in response to the frame start signal FS, and may output the second internal parameter iP2 that has been initialized to the sync signal generator 560.

The sync signal generator 560 may count the horizontal sync signal HS, increase the second internal parameter iP2 received from the initializer 530, and generate the vertical sync signal VS according to a result of comparing the second internal parameter iP2 that has been increased with a second setting value SV2. The second internal parameter iP2 may be increased by the counter 562 and comparison between the second internal parameter iP2 that has been increased and the second setting value SV2 may be performed by the comparator 564. The comparator 564 may generate the vertical sync signal VS when a value of the second internal parameter iP2 is equal to or greater than the second setting value SV2. The second setting value SV2 may be determined by Equation 4:

$$SV2 = Height + VB, \quad (4)$$

where "Height" is the height of a frame and VB is the size of a vertical blank.

During the procedure in which the sync signal generator 560 generates the vertical sync signal VS, the operations of the counter 562 and the comparator 564 may be performed within a single period of the horizontal sync signal HS in synchronization with the horizontal sync signal HS. When the sync signal generator 560 generates the vertical sync signal VS, the initializer 530 may receive the vertical sync signal VS and initialize the second internal parameter iP2.

Figure 7:
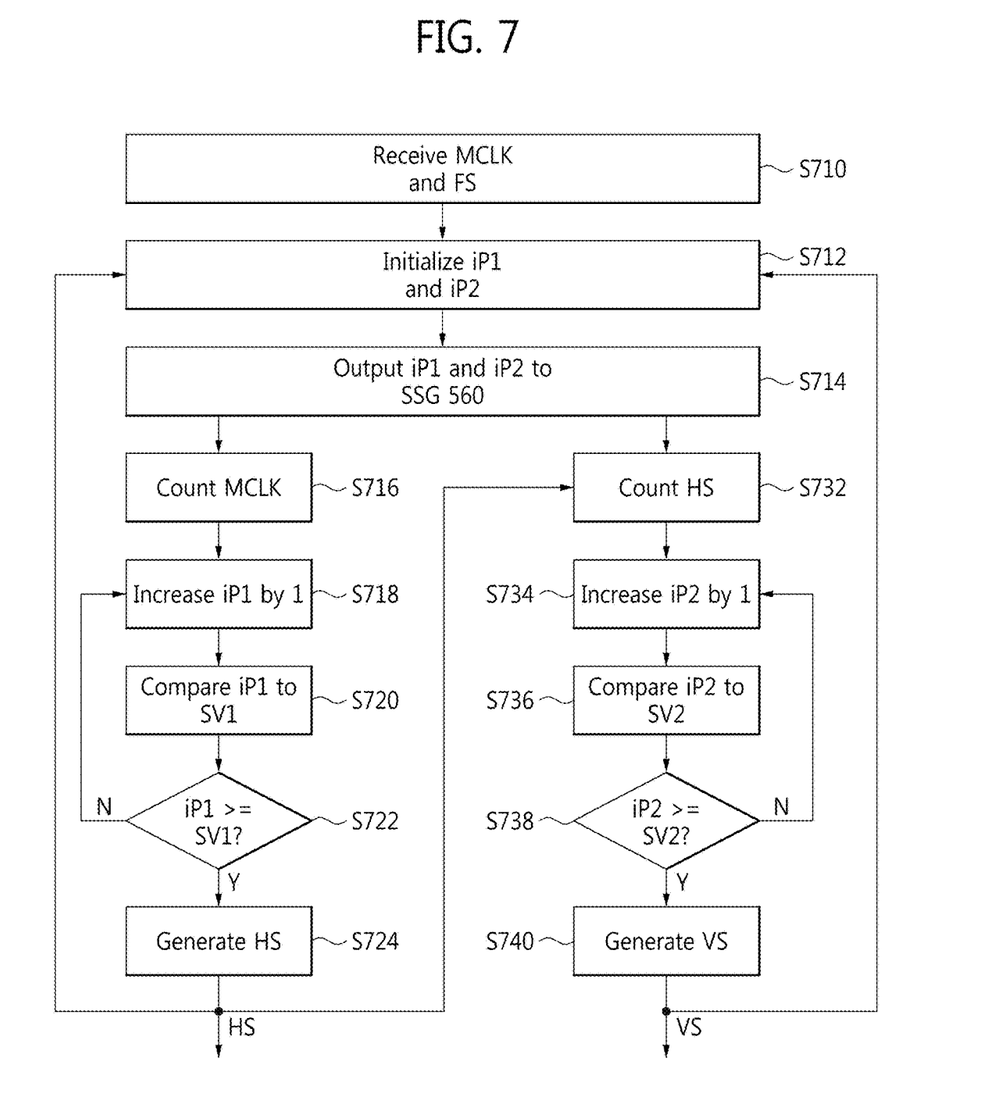
FIG. 7 is a flowchart of a method of generating a video sync signal using an electronic system according to aspects of the inventive concept.

FIG. 7 is a flowchart illustrating a method of generating a video sync signal using an electronic system according to aspects of the inventive concept. Referring to FIG. 1 and FIGS. 5 through 7, a method of generating the video sync signals HS and VS using the electronic system 1 may include receiving the MIPI clock MCLK and the frame start signal FS in operation S710. Operation S710 may be performed by the sync signal generation circuit 500.

The method may include initializing the first internal parameter iP1 and the second internal parameter iP2 of the sync signal generation circuit 500 in operation S712. Operation S712 may be performed by the initializer 530. Parameters iP1 and iP2 may then be output to SSG 560 in operation S714. After counting MCLK, operation S716, the method may include increasing the first internal parameter iP1 by 1, operation S718. Parameter iP1 may then be compared to the first setting value SV1, operation S720. If iP1 is less than SV1, operation S722, the method returns to operation S718, where iP1 is increased by 1 again. If iP1 is equal to SV1 in operation S722, horizontal sync signal HS is generated in operation S724 and counted in operation S732. The sync signal generator 560 may perform operation S400. Thereafter, the method may include increasing the second internal parameter iP2, operation S734, and comparing iP2 to SV2, operation S736. If iP2 is less than SV2, operation S738, the method returns to operation S734, where iP2 is increased by 1 again. If iP2 is equal to SV2 in operation S738, vertical sync signal VS is generated in operation S740. Operation S740 may be performed by the sync signal generator 560. After the generation of signals HS and VS, the method returns to operation S712, where iP1 and iP2 are initialized and the method is repeated.

Figure 8:
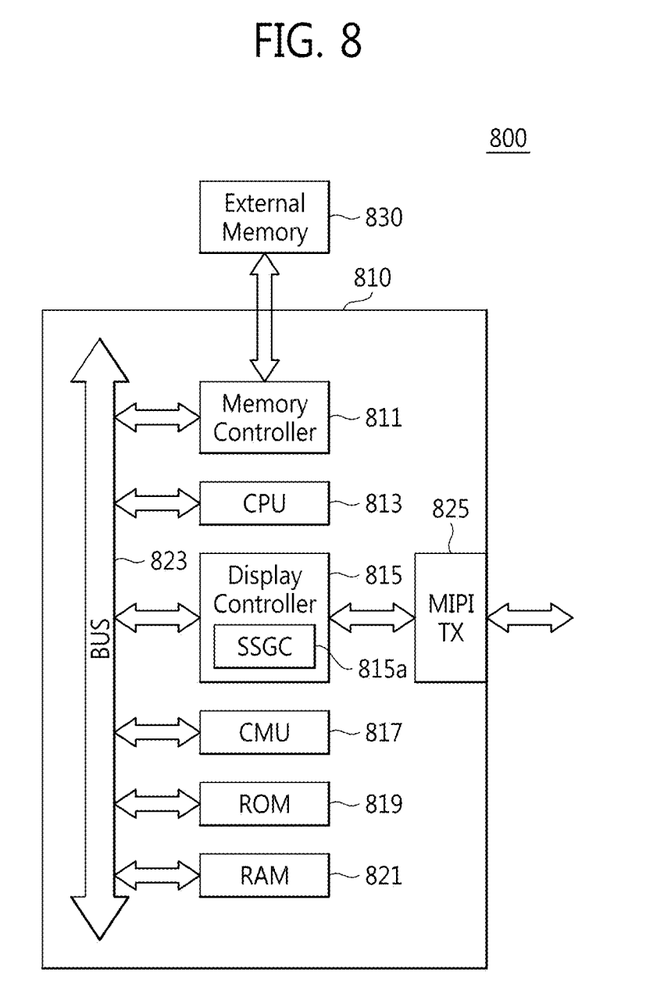
FIG. 8 is a schematic block diagram of an electronic system according to other aspects of the inventive concept.

FIG. 8 is a schematic block diagram of an electronic system 800 according to other aspects of the inventive concept. The electronic system 800 may include a host device 810 and an external memory 830. The host device 810 may include a memory controller 811, a CPU 813, a display controller 815, a clock management unit (CMU) 817, a ROM 819, a RAM 821, a system bus 823, and a MIPI TX 825.

The memory controller 811 may control the overall operation of the external memory 830 and may control data exchange between the host device 810 and the external memory 830. The memory controller 811 may receive video data from the external memory 830 and transmit the video data to the display controller 815 under the control of the CPU 813.

The CPU 813 may control the elements of the host device 810 through the system bus 823. The CPU 813 may be implemented as a multi-core processor. The multi-core processor is a single computing component with two or more independent actual processors (referred to as cores). Each of the processors may read and execute program instructions. The programs and/or the data stored in the ROM 819, the RAM 821, and/or the external memory 830 may be loaded to memory (not shown) in the CPU 813 when necessary.

The ROM 819 may store permanent programs and/or data. The ROM 819 may be implemented as erasable programmable ROM (EPROM) or EEPROM.

The RAM 821 may temporarily store programs, data, or instructions. The RAM 821 may be implemented as dynamic RAM (DRAM) or static RAM (SRAM).

The system bus 823 may directly or indirectly connect to the elements of the host device 810, functioning as a passage for data transmission among elements. The system bus 823 may also function as a passage for transmission of a control signal among the elements. The system bus 823 may include a data bus (not shown) for transmitting data, an address bus (not shown) for transmitting an address signal, and a control bus (not shown) for transmitting a control signal. The system bus 823 may include a small-scale bus, i.e., an interconnector for data communication between predetermined elements.

The CMU 817 may generate clocks having different frequencies in accordance with various requirements. The CMU 817 may generate clocks in accordance with the requirements of the elements except for the display controller 815. The clocks may be in accordance with the requirements of the CPU 813, the ROM 819, the RAM 821, the system bus 823, and the MIPI TX 825, respectively. The CMU 817 may provide the clocks for the respective elements 813, 819, 821, 823, and 825 of the host device 810. The CMU 817 may provide one of these clocks for the display controller 815.

The CMU 817 may include at least one clock component, such as a PLL, a delay-locked loop (DLL), a fractional divider, a multiplexer, or a clock gating logic, to generate the clocks. The CMU 817 may not generate a clock in accordance with the use of the display controller 815, so that a PLL and/or a fractional divider dedicated to the display controller 815 is eliminated from the CMU 817.

The display controller 815 may include a sync signal generation circuit (SSGC) 815*a*. The display controller 815 may be the display controller 300 or 300*b* illustrated in FIG. 1 or 3A or the sync signal generation circuit 500 illustrated in FIG. 5. Although the SSGC 815*a* is implemented within the display controller 815 in the embodiments illustrated in FIG. 8, the inventive concept is not restricted to the current embodiments. The SSGC 815*a* may be implemented outside the display controller 815 in other embodiments. For instance, the SSGC 815*a* may be implemented between the display controller 815 and the MIPI TX 825 or between the display controller 815 and the system bus 823.

Meanwhile, the functions and operations of the display controllers 300 and 300*b* described with reference to FIGS. 3B and 4 may also be applied to the display controller 815. Accordingly, the display controller 815 may generate a video sync signal using one of clocks that are generated by the CMU 817 and provided for the elements 813, 819, 821, 823, and 825. Here, each of the clocks generated by the CMU 817 in accordance with the uses of the elements 813, 819, 821, 823, and 825 is called an "external clock". In other words, the display controller 815 may generate the video sync signals HS and VS using the external clock instead of a dedicated clock. Furthermore, the display controller 815 may generate the video sync signals HS and VS using the MIPI clock MCLK having a lower frequency than the dedicated clock. As a result, the display controller 815 may generate a video sync signal at low cost and low power.

The display controller 815 may receive video data from the external memory 830 through the system bus 823. The display controller 815 may request video data from the memory controller 811 and receive the video data frame by frame at predetermined intervals. The display controller 815 may transmit the video data to the MIPI TX 825.

The MIPI TX 825 may include a MIPI interface. The MIPI interface may include one clock lane (not shown) and at least one data lane (not shown). The data lane may have a multi-lane structure.

Figure 9:
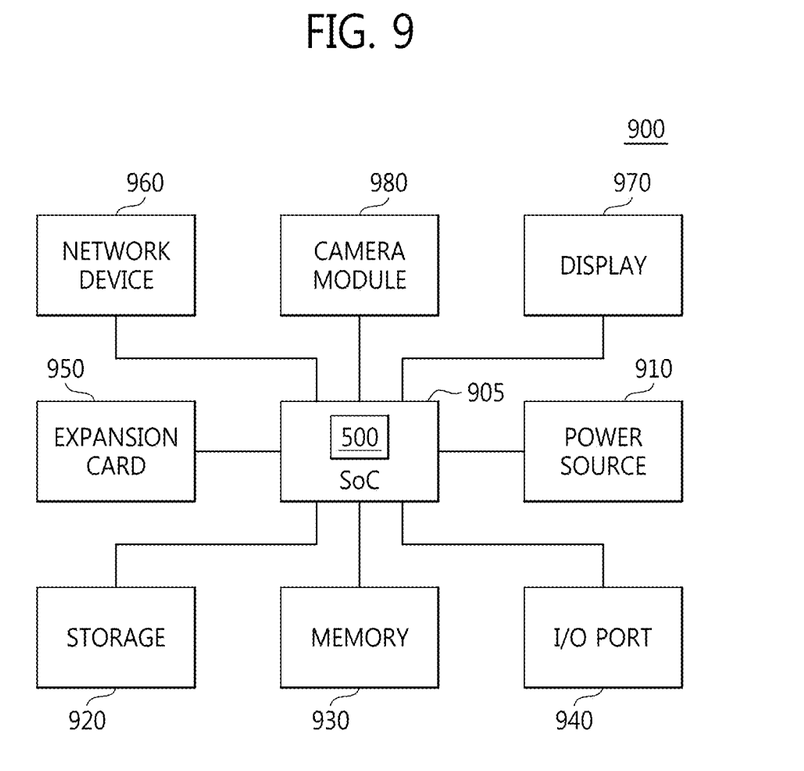
FIG. 9 is a schematic block diagram of an electronic system according to aspects of the inventive concept.

FIG. 9 is a block diagram of an electronic system 900 according to aspects of the inventive concept. Referring to FIG. 9, the electronic system 900 may be implemented as a PC, a data server, or a portable electronic device.

The portable electronic device may be a laptop computer, a mobile telephone, a smart phone, a tablet PC, a PDA, an EDA, a digital still camera, a digital video camera, a PMP, a personal navigation device or portable navigation device (PND), a handheld game console, or an e-book.

The electronic system 900 may include a system on chip (SoC) 905, a power source 910, a storage 920, a memory 930, an input/output (I/O) port 940, an expansion card 950, a network device 960, and a display 970. The electronic system 900 may also include a camera module 980.

The SoC 905 may include the sync signal generation circuit 500. The sync signal generation circuit 500 may be the sync signal generation circuit 500 illustrated in FIG. 5. The SoC 905 may control the operation of at least one of the elements 910 through 980.

The power source 910 may supply an operating voltage to at least one of the elements 905 and 920 through 980. The storage 920 may be implemented as a hard disk drive (HDD) or a solid state drive (SSD).

The memory 930 may be implemented as a volatile or non-volatile memory. A memory controller (not shown) that controls a data access operation, e.g., a read operation, a write operation (or a program operation), or an erase operation, on the memory 930 may be integrated into or embedded in the SoC 905. Alternatively, the memory controller may be provided between the SoC 905 and the memory 930.

The storage 920 may store programs or data. The memory 930 may store programs or data and may be implemented as volatile memory or non-volatile memory.

The I/O port 940 receives data transmitted to the electronic system 900 or transmits data from the electronic system 900 to an external device. For instance, the I/O port 940 may be a port for connection with a pointing device such as a computer mouse, a port for connection with a printer, or a port for connection with a universal serial bus (USB) drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage 920, the memory 930, the I/O port 940, the expansion card 950, or the network device 960.

The camera module 980 is a module that can convert an optical image into an electrical image. Accordingly, the electrical image output from the camera module 980 may be stored in the storage 920, the memory 930, or the expansion card 950. In addition, the electrical image output from the camera module 980 may be displayed through the display 970.

Figure 10:
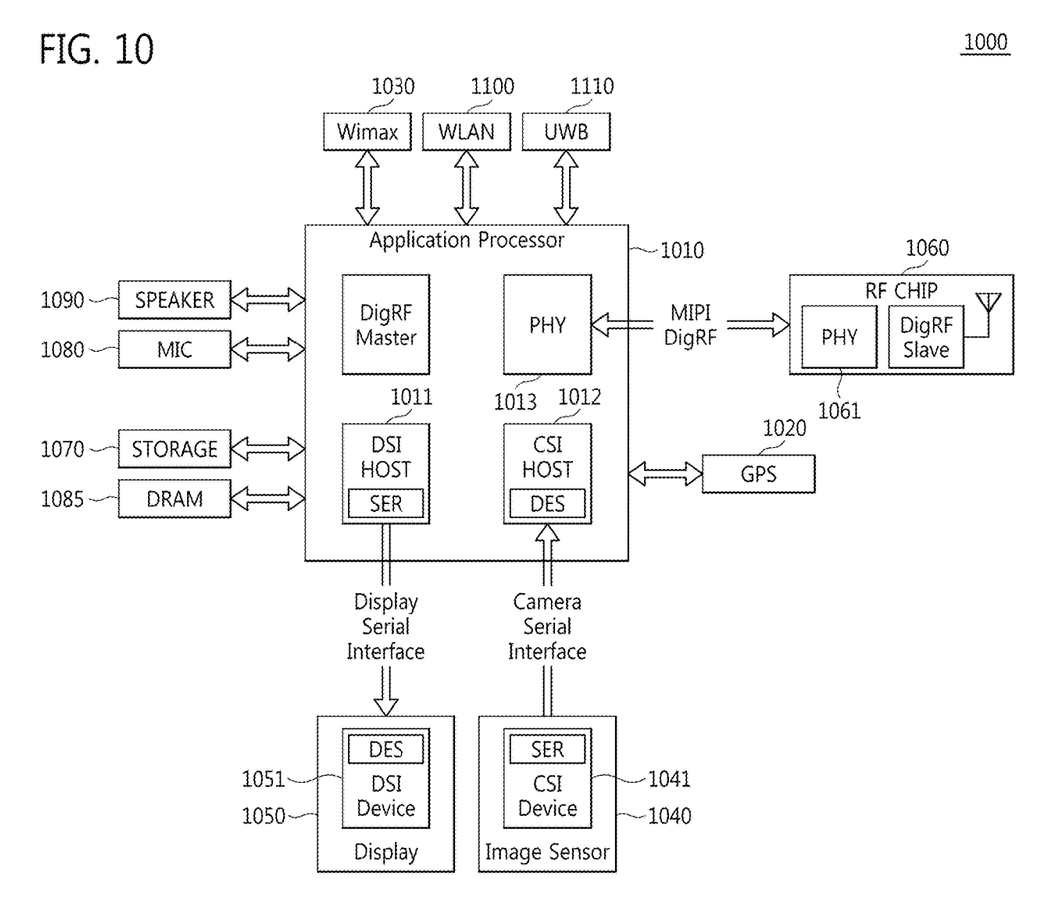
FIG. 10 is a schematic block diagram of an electronic system 1000 according to aspects of the inventive concept.

FIG. 10 is a block diagram of an electronic system 1000 according to aspects of the inventive concept. Referring to FIG. 10, the electronic system 1000 may be a data processing apparatus capable of using or supporting MIPI interface, e.g., a mobile phone, a personal digital assistant (PDA), a portable multimedia player (PMP), an internet protocol television (IPTV), or a smart phone.

The electronic system 1000 includes an application processor 1010, the image sensor 1040, and a display unit 1050.

A camera serial interface (CSI) host 1012 included in the application processor 1010 may establish serial communication with a CSI device 1041 of the image sensor 1040 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The application processor 1010 may include the sync signal generation circuit 500 (not shown). The sync signal generation circuit 500 may be the sync signal generation circuit 500 illustrated in FIG. 5.

The electronic system 1000 may further include a radio-frequency (RF) chip 1060 for communicating with the application processor 1010. A physical layer PHY 1013 of the application processor 1010 and a physical layer PEW 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

As described above, according to some embodiments of the inventive concept, an electronic system generates a video sync signal using an external clock instead of a dedicated clock and eliminates a dedicated PLL and/or a dedicated fractional divider for generating the video sync signal, so that the electronic system generates the video sync signal at low cost and low power. In addition, the electronic system generates the video sync signal using the external clock having a lower frequency than the dedicated clock, thereby generating the video sync signal at low cost and low power.

Although a few embodiments of the present general inventive concepts have been shown and described, it will be appreciated by those skilled in the art that changes may be made in these embodiments without departing from the principles and spirit of the general inventive concepts, the scope of which is defined in the appended claims and their equivalents.

What is claimed is:

1. A device comprising:
an initializer configured to initialize a first parameter in response to a frame start signal; and
a sync signal generator including a counter and a comparator,
wherein the counter receives the first parameter from the initializer, counts an external clock that is provided from an external display device for transmitting video data through an interface between the device and the external display device, and increases a value of the first parameter based on counting the external clock, and
the comparator receives the first parameter, compares the increased value of the first parameter with a first value, and outputs a video sync signal to the external display device when the increased value of the first parameter is equal to or greater than the first value.

2. The device of claim 1, wherein the external clock is one selected from the group consisting of a bus clock, a central processing unit (CPU) clock, a random access memory (RAM) clock, and a mobile industry processor interface (MIPI) clock.

3. The device of claim 1, wherein the device is a display controller.

4. The device of claim 1, further comprising a special function register (SFR) configured to store the first value.

5. The device of claim 1, wherein after counting the external clock, the counter increases the value of the first parameter by one.

6. An application processor (AP) comprising:
a clock generator configured to generate a first clock; and
a display controller configured to receive the first clock from the clock generator, and including a counter and a comparator,
wherein the first clock is provided from an external display device for transmitting video data through an interface between the AP and the external display device,
the counter receives a first parameter, counts the first clock, and increases a value of the first parameter based on counting the first clock, and
the comparator receives the first parameter, compares the increased value of the first parameter with a first value, and outputs a video sync signal to the external display device when the increased value of the first parameter is equal to or greater than the first value.

7. The AP of claim 6, wherein the display controller includes an initializer configured to initialize the first parameter.

8. The AP of claim 6, wherein the clock generator does not generate the first clock for a use of the display controller.

9. The AP of claim 6, further comprising a CPU configured to generate the first value.

10. The AP of claim 6, wherein the clock generator generates a second clock having a different frequency from a frequency of the first clock.

11. The AP of claim 6, wherein the clock generator is a phase-locked loop (PLL), a delay-locked loop (DLL), a fractional divider, a multiplexer, or a clock gating logic.

12. The AP of claim 6, wherein the first clock is one selected from the group consisting of a bus clock, a central processing unit (CPU) clock, a random access memory (RAM) clock, and a mobile industry processor interface (MIPI) clock.

13. A display controller comprising:
an initializer configured to receive a frame start signal, and configured to initialize a first parameter in response to the frame start signal; and
a sync signal generator configured to receive an external clock that is provided from an external display device for transmitting video data through an interface between the display controller and the external display device, and including a counter and a comparator,
wherein the counter counts the external clock, and increases a value of the first parameter received from the initializer, and
the comparator compares the increased value of the first parameter with a first value, and outputs a video sync signal to the external display device when the increased value of the first parameter is equal to or greater than the first value.

14. The display controller of claim 13, wherein a phase-locked loop (PLL) is not included in the display controller.

15. The display controller of claim 13, wherein after counting the external clock, the counter increases the value of the first parameter by one.

16. The display controller of claim 13, comprising a special function register (SFR) configured to store the first value.

17. The display controller of claim 13, wherein the external clock is one selected from the group consisting of a bus clock, a central processing unit (CPU) clock, a random access memory (RAM) clock, and a mobile industry processor interface (MIPI) clock.

* * * * *